United States Patent [19]
Blohm et al.

[11] Patent Number: 5,385,984
[45] Date of Patent: Jan. 31, 1995

[54] POLYARYLENE ETHER-ORGANOPOLYSILOXANE COPOLYMERS

[75] Inventors: Margaret L. Blohm; Sterling B. Brown, both of Schenectady; George T. Seeger, Scotia, all of N.Y.; Patricia P. Anderson, Williamstown, Mass.

[73] Assignee: General Electric Company, Schenectady, N.Y.

[21] Appl. No.: 139,140

[22] Filed: Oct. 21, 1993

[51] Int. Cl.[6] ............................................. C08G 65/48
[52] U.S. Cl. ................................. 525/393; 525/396; 525/397; 525/474; 525/476; 525/905
[58] Field of Search ............... 525/393, 396, 397, 474, 525/905, 476

[56] References Cited

U.S. PATENT DOCUMENTS

| | | | |
|---|---|---|---|
| 3,668,273 | 6/1972 | Krantz | 525/393 |
| 4,654,405 | 3/1987 | Jalbert et al. | 525/391 |
| 4,656,405 | 4/1987 | Kiya et al. | 318/571 |
| 4,746,708 | 5/1988 | Sybert | 525/392 |
| 4,797,453 | 1/1989 | Taubitz et al. | 525/397 |
| 4,808,674 | 2/1989 | Johnson et al. | 525/397 |
| 4,873,286 | 10/1989 | Gallucci et al. | 525/92 |
| 5,096,979 | 3/1992 | Brown et al. | 525/396 |
| 5,109,067 | 4/1992 | Dae et al. | 525/476 |
| 5,177,156 | 1/1993 | Aritomi et al. | 525/393 |

OTHER PUBLICATIONS

Abstract-Hydroxyalkyl-and Aminoalkyl-Functionalized polyphenylene ethers, PD Sybert, May 27, 1986—Synthetic High Polymers, vol. 109, 1988 (p. 15).
Abstract-Jpn. Kokai Tokkyo Koho JP 4 80,231 [92 80,231] (CA 117 27558, 1992) Reaction of epoxy-terminated (epichlorohydrin-capped) PPO with triethylenetetraamine. p. 30.
Abstract-Jpn. Kokai Tokkyo Koho JP 04 68,024 [92 68 024] (CA 117 49492, 1992) Reaction of PPO with 2,4-toluenediisocyanate followed by reaction with base. p. 16.
Abstract-EP 476,619 (Mitsubishi Petrochem., 1992) (CA 117 112310, 1992) Reaction of PPO-OH end groups with alpha-chloro, omega-aminoalkane. p. 16.
Abstract-Ger. Offen. 2,107,726 (1972) (CA 77 20760, 1972) Reaction of vinyl-containing polydimethyl siloxane with PPO. p. 58.
Abstract-Jpn. Kokai Tokkyo Koho JP 59,222,203 [84,222,203] (CA 102 167974, 1985) Reaction of brominated PPO with gamma-aminopropyl-terminated polydimethyl siloxane in DMF. p. 61.
Abstract-Jpn. Kokai Tokkyo Koho JP 621,252,214 [86 252,214] CA 106 214642, 1987) Metallation of PPO using BuLi/TMEDA followed by quenching with chloro-termianted siloxane. There are several additional patents and publications which describe minor variations on this method. p. 17.
Abstract-Polym. Bull. 2219, 103 (1988) (CA 108 187389, 1988) Reaction of PPO-OH end-groups with silylamine-terminated polydimethyl siloxane. p. 7.
Abstract-EP 433,746 (1991/Ge) CA 115 72529, 1991) Hydrosilation of allyl-functionalized PPO using hydride-terminated polydimethyl siloxane. p. 22.
Abstract-Jpn. Kokai Tokkyo Koho JP 04 76,051 [92 76,051] (CA 117 172770, 1992) Reaction of PPO-OH end groups with gamma-epoxypropyl-termethoxysilane in the presence of base (Note this is not a polysiloxane). pp. 49-50.

*Primary Examiner*—John C. Bleutge
*Assistant Examiner*—Mark D. Sweet
*Attorney, Agent, or Firm*—William A. Teoli; William H. Pittman

[57] ABSTRACT

Polyarylene ether-organopolysiloxane copolymers are provided having amine, or ester connecting linkages between blocks resulting from the melt extrusion of epoxy, carboxy or amine functionalized polyarylene ether with epoxy, carboxy or amine functionalized organopolysiloxane.

6 Claims, No Drawings

POLYARYLENE ETHER-ORGANOPOLYSILOXANE COPOLYMERS

Reference is made to copending application Ser. No. 08/139,134, now pending filed concurrently herewith.

BACKGROUND OF THE INVENTION

The present invention relates to polyarylene ether-organopolysiloxane copolymers having amine or ester connecting groups between blocks.

As shown by Shea et al., U.S. Pat. No. 4,814,392, silicone-polyarylene ether copolymers can be made by effecting reaction between amino terminated organopolysiloxane and anhydride functionalized polyarylene ether. A reaction can be effected between a polyphenylene ether referred to hereinafter as "PPE", which has been functionalized with anhydride groups utilizing a compound, such as trimellitic anhydride acid chloride, (TAAC), or maleic anhydride (MA), and an amine terminated polydiorganosiloxane. Reaction between PPE-TAAC or PPE-MA, and the amine terminated polydiorganosiloxane is preferably effected by a solution technique utilizing an organic solvent, such as chloroform in an inert atmosphere.

In copending application Ser. No. 08,139,134, now pending, there is taught that reaction between anhydride or carboxy functionalized PPE and amine functionalized organopolysiloxane can be facilitated by employing vacuum venting during reactive coextrusion. Polyphenylene ether-organopolysiloxane copolymers made by such vacuum vented extrusion have PPE blocks joined to organopolysiloxane blocks by imide or amide linkages.

The present invention is based on the discovery that vacuum venting during reactive coextrusion also can be used to facilitate the formation of polyarylene ether-organopolysiloxane block copolymers by effecting reaction between epoxide functional groups with amine, or carboxylic acid functional groups, where the functional groups can be located in the terminal position on either the polyarylene ether or organopolysiloxane. The resulting polyarylene ether-organopolysiloxane block copolymers have amine or ester connecting groups between blocks instead of imide or amide linkages.

STATEMENT OF THE INVENTION

There is provided by the present invention, polyarylene ether-organopolysiloxane block copolymers resulting from the reaction between an epoxy functionalized polyarylene ether, and an amino or carboxy functionalized organopolysiloxane, or an epoxy functionalized organopolysiloxane, and an amino or carboxy functionalized polyarylene ether, where the polyarylene ether-organopolysiloxane copolymers comprise by weight from 80 to 99.9% of polyarylene ether and from 20 to 0.1% of organopolysiloxane, and the polyarylene ether blocks are joined to the organopolysiloxane blocks by a connecting divalent structural unit selected from, $$-\text{CH}-\text{CH}_2-\text{Y}-, \text{ and } -\text{CH}-\text{CH}_2-\text{Y},$$
$$\phantom{-\text{CH}}|\phantom{-\text{CH}_2-\text{Y}-, \text{ and}} \phantom{--\text{CH}}|$$
$$\phantom{-\text{CH}-}\text{X}\phantom{-\text{CH}_2-\text{Y}-, \text{ and }--\text{CH}-}\text{X}$$
$$\phantom{-\text{CH}-\text{CH}_2-\text{Y}-, \text{ and }--\text{CH}-\text{X}}|$$

where X and Y are monovalent or divalent radicals, and when X is monovalent, Y is divalent, and when Y is monovalent, X is divalent, and when X and Y are monovalent, they are hydroxy, and when X and Y are divalent, they are members selected from the group consisting of

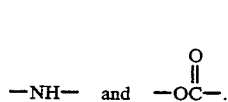

Epoxy functionalized polyarylene ethers which can be used to make the polyarylene ether-organopolysiloxane block copolymers are shown by Brown et al., U.S. Pat. No. 4,994,531, which is incorporated herein by reference. These materials can be prepared by effecting reaction between a polyarylene ether and a polymerizable epoxy containing olefinic compound in the presence of a free radical initiator. An additional method for making an epoxy functionalized polyarylene ether is shown by Brown et al., U.S. Pat. No. 5,096,979, where an epoxy-triazine-capped polyarylene ether is prepared by the reaction of a polyarylene ether, such as PPE, and an epoxychlorotriazine, such as a diglycidyl chlorocyanurate.

Other functionalized polyarylene ethers that can be used in the practice of the invention to make polyarylene ether-organopolysiloxane copolymers having connecting structural units of formula (1) are carboxy functionalized polyarylene ethers as shown by Chalk et al., J. Polymer Sci. Part A-1, 7,691–705 (1969) and U.S. Pat. Nos. 4,654,405, and 4,797,453. Amine functionalized polyphenylene ether, such as shown by U.S. Pat. No. 4,746,708 and JP 04 80 231[ 92 80 231] CA 117 27558 (1992) also can be used.

Among the preferred functionalized organopolysiloxanes which can be used in the practice of the invention are organo amine functionalized organopolysiloxanes as shown by the following formula,

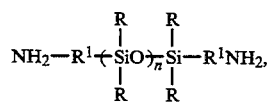

where R is a $C_{(1-4)}$ monovalent hydrocarbon radical or $C_{(1-14)}$ monovalent hydrocarbon radical which can be substituted with up to 4 radicals which can be the same, or mixtures thereof, and inert during intercondensation, $R^1$ is a $C_{(1-14)}$ divalent hydrocarbon radical or substituted $C_{(1-14)}$ divalent hydrocarbon radical substituted with from 1–4 radicals or mixtures thereof inert during intercondensation, and n is an integer having an average value of from about 1 to 500 inclusive, and preferably 5 to 400. $R^1$ is preferably $C_{(1-14)}$ polymethylene.

Carboxy functionalized polydiorganosiloxane can be made by the procedure shown by Bluestein, U.S. Pat. No. 3,047,497.

Polyarylene ether-organopolysiloxane block copolymers also can be made by utilizing epoxy functionalized organopolysiloxanes which can be made by the procedures shown by Eckberg, U.S. Pat. No. 4,952,657 and U.S Pat. No. 4,977,198.

The polyarylene ether-organopolysiloxane block copolymers of the present invention having at least one of the above-described connecting structural units between blocks can be made by employing vacuum venting during reactive coextrusion of the epoxy functionalized polyarylene ether or epoxy functionalized organopolysiloxane with polyarylene ether or organopolysiloxane functionalized with carboxy or amino groups. Reaction between the respective functionalized polymers can be achieved under reactive melt extrusion conditions at temperatures in the range of from 275° C. to 320° C. During the melt extrusion of the respective functionalized polyarylene ether and organopolysiloxane, vacuum venting can be used at a pressure in the range of about 10 torr to 500 torr and preferably 20 to 100 torr.

In order that those skilled in the art will be better able to practice the present invention the following example is given by way of illustration and not by way of limitation. All parts are by weight.

EXAMPLE

Epoxy-triazine-capped polyphenylene ether was prepared in accordance with the procedure shown in Brown et al., U.S. Pat. No. 5,096,979. The resulting polyphenylene ether composition referred to hereinafter as "functionalized PPE" consisted of about 65% by weight of functionalized polyphenylene ether and unfunctionalized polyphenylene ether. The functionalized PPE had an IV of about 0.41 dl/g in chloroform at 25° C. Several blends of functionalized PPE and aminopropyl terminated polydimethylsiloxane having an average block size of about 10 or about 20 dimethylsiloxy units were combined in a Henshel mixer and extruded on a 20 mm Welding Engineers twin screw extruder with counter-rotating non-intermeshing screws. All blends were extruded with vacuum venting (30-40 torr) at 475 rpm and approximately 6 lb/hr feed rate. Temperature settings were 295° C. for the die and the last 4 barrel segments. The feed throat and second barrel segments were set at 65° C. and read around 105° C. during the actual extrusion. Test parts were molded on a 30 ton Engle machine at a 90° C. mold temperature and a 25.5 seconds cycle time with barrel set temperatures of 280° C. (rear), 340° C., 340° C., and 340° C. (nozzle).

An attempt was made to prepare polyphenylene ether-polydimethylsiloxane copolymers following the same procedure without vacuum venting. There was obtained an incoherent foaming mass which appeared to have charred somewhat.

Copolymer-containing extrudates prepared with vacuum venting were easily formed into 5 inch × ½ inch × 1/16 inch test parts. The injection molded test parts were then evaluated for UL94 average flameout time (FOT), and V-0 or V-1 flame retardance performance. Transparency of the molded part indicates that the amine terminated polydimethylsiloxane fluid had been compatibilized as a result of copolymer formation. The following results were obtained:

TABLE 1

| Funct. PPE (phr) | PPE (phr) | GAPD10 (phr) | GAPD20 (phr) | Appearance1/16" MoldedPart | Avg. UL94 FOT(sec) | UL94 |
|---|---|---|---|---|---|---|
| — | 100 | 0 | 0 | Transparent | 10.2 | V-1 |
| — | 100 | 2 | 0 | Opaque | 3.59 | V-0 |
| 50 | 50 | 5 | 0 | Transparent | 2.32 | V-0 |
| 50 | 50 | 2 | 0 | Transparent | 3.15 | V-0 |
| 50 | 50 | 0 | 5 | Translucent | 3.13 | V-0 |
| 50 | 50 | 0 | 2 | Translucent | 4.81 | V-0 |

In addition to UL94 flame retardant performance Ohio State University standards for total heat reduction (OSU HTOT) and total smoke release (OSU STOT) were also evaluated in comparison to a PPE control. The results are shown in the following table. The second entry of each pair is a repeat blend prepared independently.

TABLE 2

| Funct PPE(phr) | PPE (phr) | GAPD10 (phr) | %Reduction OSU HTOT | %Reduction OSU STOT |
|---|---|---|---|---|
| 0 | 100 | 2 | 1.0 | 3.3 |
| 50 | 50 | 5 | 27.7 | 46.3 |
| " | " | 5 | 15.0 | 16.9 |
| " | " | 2 | 28.8 | 43.8 |
| " | " | 2 | 30.9 | 41.6 |

The mechanical properties of the test samples were also evaluated as shown by the following results:

TABLE 3

| Funct. PPE | PPE (phr) | GAPD10 (phr) | Notched Izod Impact (ft lb/in) | Flex Mod (kpsi) | Tensile Elongation |
|---|---|---|---|---|---|
| — | 100 | 0 | 0.52 | 394 | 30.5 |
| 50 | 50 | 5 | 1.07 | 337 | 17.2 |
| " | " | 2 | 0.52 | 359 | 23.4 |

Although the above example is directed to only a few of the very many polyarylene ether-organopolysiloxane block copolymers of the present invention, it should be understood that the present invention is directed to a much broader variety of such copolymers as set forth in the description preceding this example.

What is claimed is:

1. Polyarylene ether-organopolysiloxane copolymers having polyarylene ether blocks joined to organopolysiloxane blocks by a connecting divalent structural unit selected from,

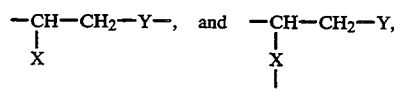

where X and Y are monovalent or divalent radicals, and when X is monovalent, Y is divalent, and when Y is monovalent, X is divalent, and when X and Y are monovalent, they are hydroxy, and when X and Y are divalent, they are members selected from the group consisting of

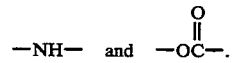

the polyarylene ether-organopolysiloxane copolymers result from the reaction between, (A) an epoxy group functionalized polyarylene ether and an amino or carboxy group functionalized organopolysiloxane and, (B) an epoxy group functionalized organopolysiloxane and an amino or carboxy group functionalized polyarylene ether, and the polyarylene ether-organopolysiloxane copolymers comprise by weight, from 80 to 99.9% of polyarylene ether and from 20 to 0.1% of organopolysiloxane.

2. Polyarylene ether-organopolysiloxane copolymers in accordance with claim 1, where the polyarylene ether is polyphenylene ether.

3. Polyarylene ether-organopolysiloxane copolymers in accordance with claim 1, where the organopolysiloxane block is polydimethylsiloxane.

4. A copolymer in accordance with claim 1, resulting from the melt extrusion of epoxy-triazine-capped polyarylene ether.

5. A copolymer in accordance with claim 1, resulting from the melt extrusion of functionalized polyarylene ether with amino organo capped polydiorganosiloxane.

6. A polyarylene ether-polydiorganosiloxane copolymer resulting from the reaction between an epoxy-triazine-capped polyarylene ether and a carboxy functionalized polydiorganosiloxane.

* * * * *